(12) United States Patent
Hanzawa

(10) Patent No.: US 6,521,344 B1
(45) Date of Patent: Feb. 18, 2003

(54) MEMBER FOR BRAKE

(75) Inventor: Shigeru Hanzawa, Kagamihara (JP)

(73) Assignee: NGK Insulators Ltd., Nagoya (JP)

( * ) Notice: Subject to any disclaimer, the term of this patent is extended or adjusted under 35 U.S.C. 154(b) by 0 days.

(21) Appl. No.: 09/177,730

(22) Filed: Oct. 23, 1998

(30) Foreign Application Priority Data

Sep. 8, 1998 (JP) .......................................... 10-253699

(51) Int. Cl.[7] ...................... C04B 35/565; C04B 35/577
(52) U.S. Cl. ........................ 428/408; 428/446; 428/368; 428/476.3; 428/476.9; 428/384; 428/378
(58) Field of Search ................................ 428/408, 446, 428/368, 476.3, 476.9, 384, 378

(56) References Cited

U.S. PATENT DOCUMENTS 5,560,455 A * 10/1996 Atmur et al.
6,162,544 A    12/2000 Hanzawa

FOREIGN PATENT DOCUMENTS

| DE | 44 38 456 A1 | 5/1996 |
|----|--------------|--------|
| EP | 0 864 548 A2 | 9/1998 |
| GB | 1 457 757    | 12/1976 |
| WO | 99/19273     | 4/1999 |

OTHER PUBLICATIONS

U.S. patent application Ser. No. 09/636,569, Hanzawa et al., filed Aug. 10, 2000.
U.S. patent application Ser. No. 09/663,037, Hanzawa et al., filed Sep. 15, 2000.
U.S. patent application Ser. No. 09/854,757, Hanzawa et al., filed May 14, 2001.
U.S. patent application Ser. No. 09/211,085, Hanzawa, S. et al, filed Dec. 14, 1998.
U.S. patent application Ser. No. 09/496,377, Hanzawa, S. et al., filed Feb. 2, 2000.
U.S. patent application Ser. No. 09/802,581, Hanzawa, S. et al., filed Mar. 8, 2001.

* cited by examiner

Primary Examiner—Rich Weisberger
(74) Attorney, Agent, or Firm—Burr & Brown

(57) ABSTRACT

A member for brakes that has a light weight, shock resistance characteristics, excellent corrosion resistance characteristics etc., high abrasive wear resistance characteristics and is made from fiber-composite material is comprised of an assemblage of yarns in which yarns, containing at least a bundle of carbon fibers and a carbon component other then carbon fiber are three-dimensionally combined and integrally formed so as to avoid separation there between; and matrices made of Si—SiC-based material filling the spaces between said yarns adjacent to each other within said assemblage of yarns.

8 Claims, 5 Drawing Sheets

MEMBER FOR BRAKE

BACKGROUND OF THE INVENTION AND RELATED ART

1. Field of the Invention

The present invention relates to a member for brakes in large ground transport machines, for example, an installed member for brakes which is connected with a speed control device and used as the friction material of brake discs for speed control or stopping of a large class automobile.

2. Related Art Statement

Composite Carbon Fiber (hereinafter referred to as "C/C"), which is lightweight and presently known to have an extremely high coefficient of friction under the conditions of high temperatures, is widely used as a friction material that is connected to a controlling device for a large class automobile such as a large ground transport machine.

Depending on changes in driving conditions, long continuous periods of braking or frequent pumping of the brakes may be necessary in order to stop these types of large ground transport machines. As such, in the case where C/C is used as a friction material in the braking device, that braking device will be operating under high temperature for long periods of time in an open atmosphere. Therefore, because carbon fiber, which generally burns easily at high temperatures, is used as the main component for these friction materials, cases have been reported where under such conditions a reaction with oxygen occurs and not only do the friction materials undergo remarkable wear, but they cause smoke, which, as it has been reported, has come just before big accidents have occurred. However, presently there are no known substitute raw materials available when considering the high frictional power which occurs under high temperatures and the efficiency of flexibility and the like which is required at the moment the disc brake is applied.

SUMMARY OF THE PRESENT INVENTION

It is an object of the present invention to, provide frictional materials for brakes which maintain the C/C composite's excellent features of shock resistance and light weight, and provide frictional materials for brake usage. It is a further object of the present invention to provide frictional materials for brake usage which, even in the case where frictional materials for the brakes of large ground transport machines were used, are capable of avoiding the current need for frequent changes in brake pads, since as in the C/C composite, in an oxygen environment and under high temperatures, inevitably severe wear will occur.

The inventors have studied intensively and have found that the above-mentioned aim can be attained by using a fiber-composite material which maintains the excellent features of shock resistance and light weight, and is able to sufficiently withstand wear in an oxygen environment where high temperatures occur and where other disc brake frictional materials would have broken down, and where frequent replacement, such as are necessary with the C/C composite, are not necessary, and intermittent use is possible. This fiber-composite material is prepared by a yarn, including at least a bundle of carbon fiber and a carbon component other than carbon fiber, which is three-dimensionally combined and integrally formed so as to avoid separation of the carbon fiber bundle and the carbon component, into an assemblage of yarns. The space between the adjacent yarn is then filled with a matrix made of Si—SiC-based material. The present invention has been completed based on the above mentioned finding.

The fiber composite material used to make the frictional material for brakes (hereinafter sometimes only referred to as a member for brakes) of the present invention, is unitarily formed into the spaces of the assemblage of yarns derived from carbon fiber, which is three-dimensionally combined and integrally formed so as to avoid separation, by a matrix derived from Si—SiC-based material. In the hereinafter stated case where layers of the matrices formed from Si—SiC-based material are provided, the thickness of the layer is preferably 0.01 mm or more, more preferably 0.05 mm or more, and most preferably 0.1 mm or more.

Additionally, for said fiber composite material used to make the frictional material for brakes, said matrix has an inclined composition in which the content rate of silicon becomes higher in proportion to its distance from the above stated yarn. Also, either one, two, or more of boron nitride, boron, copper, bismuth, titanium, chrome, tungsten, or molybenum can be included in said fiber composite material. Further, at normal temperature the dynamic coefficient of friction for the above stated frictional material for brakes is preferably 0.05~0.06 and as the temperature rises, it is preferable for the dynamic coefficient of friction to rise correspondingly.

BRIEF DESCRIPTION OF THE DRAWINGS

FIG. 3 is a sectional enlargement of FIG. 2a.

DETAILED DESCRIPTION OF THE PREFERRED EMBODIMENT

Figure 1:
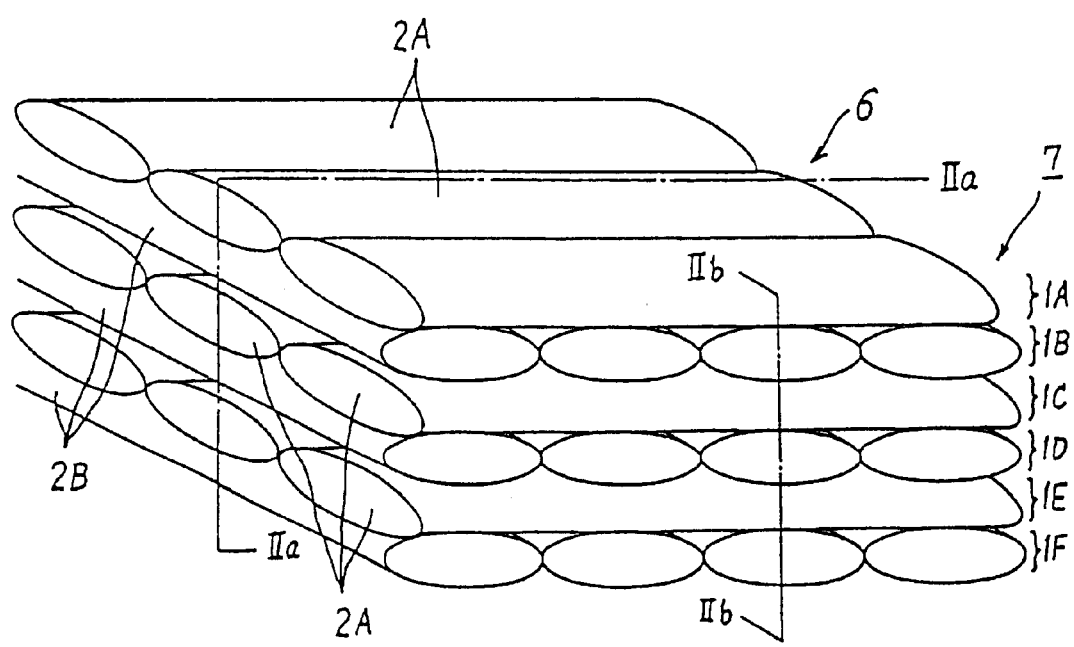
FIG. 1 is a perspective view schematically showing the structure of an assemblage of yarns of one basic structure of a fiber composite material for a member for brakes of the present invention.

A layer made from Si—SiC material is arranged on a parent material made from a C/C composite to form the composite material made from ceramics, metal, and carbon, for the frictional materials for the brakes of the present invention.

Hereinafter, the new fiber composite material for the frictional materials for the brakes of the present invention is described.

The cumulative improvements, which are made by the present invention to the basic structure of the known C/C composite, constitute a new concept in materials.

Basic materials are used to produce a C/C composite in the following known process; several hundred to several ten thousand pieces, ordinarily, of carbon fiber having a diameter of about 10 μm are bundled to obtain fiber bundles (yarn), and the fiber bundles are arranged two-dimensionally or three-dimensionally to form either a one-directional sheet (UD sheet) or various kinds of cloth. These sheets or cloths are laminated to form a preformed product with a predetermined shape (fiber preform). A matrix made of carbon is formed within the preformed product by CVI method (Chemical-vapor impregnation method) or by inorganic-polymer-impregnation sintering method to obtain a C/C composite. For the C/C composite to be used in the present invention, a carbon powder, more particularly a carbon powder that has been changed to graphite is preferable as a carbon component, other than the carbon fiber in the yarn.

The structure of the carbon fibers of the above mentioned fiber-composite material of the present invention, which has a C/C component as its parent material, is very unique in that it can be maintained without breaking down. In addition to this, the space in the assemblage of yarns between the adjacent yarn is filled with minutely structured matrices made of Si—SiC-based material.

In the present invention the term, "Si—SiC-based material" is a general term for materials which contain silicon and carbonized silicon, and this Si—SiC-based material is produced as shown below: In the case of the present invention, a C/C composite, or the compact thereof, is impregnated with silicon. At that moment, a reaction between the silicon and the carbon atoms forming the carbon fibers and/or between the free carbon atoms present on the surface of the carbon fibers, occurs in the composite, which creates a portion of silicon that has been carbonized in the uppermost surface of the C/C composite and/or in the spaces among the yarns made from carbon fibers. Thus, a matrix containing carbonized silicon is formed in the spaces among the yarns. The matrix may contain some intermediate phases from the silicon phase to the almost-pure silicon carbide phase, in which silicon has almost purely remained. That is, the matrix is typically composed of the silicon phase and the silicon carbide phase, but may contain the Si—SiC coexisting phase, based on silicon and in which the carbon content changes with gradient between the silicon phase and the silicon carbide phase. Therefore, Si—SiC-based material is a general term for the material in which the carbon concentration changes from 0 mole % to 50 mole % in such a Si—SiC system.

In the above stated fiber-composite material used as raw materials for the frictional materials for brakes of the present invention, preferably, the matrix comprises the silicon carbide phase that has grown along the surface of the yarn. In this case, the strength of each individual yarn is further improved, and the fiber-composite material becomes difficult to damage.

Further, in the above fiber-composite material, preferably, the matrix is comprised of the silicon phase that is made of silicon, and the silicon carbide phase has been formed between this silicon phase and the yarn. In this case, the surface of the yarn is strengthened by the silicon carbide phase. At the same time, the micro-dispersion of stress is further promoted because the central part of the matrix is composed of a silicon phase that has a relatively low hardness.

In the fiber-composite material, preferably, the matrix has an inclined composition in which the content rate of silicon becomes higher according to its distance from the surface of the yarn.

In the fiber-composite material, preferably, the assemblage of yarns comprises more than one yarn array element, each of the yarn array elements being formed by arranging more than one yarn two-dimensionally in a nearly parallel direction, and by each of the yarn array elements being laminated. The fiber-composite material, therefore, has a laminated structure in which the yarn array elements have a plurality of layers that are laminated and fixed in a unilateral direction.

In this case, it is particularly preferable that the direction of the length of each yarn, in the yarn array elements adjacent to each other, intersect each other. The dispersion of stress is further promoted therewith. More preferably, the direction of the length of each yarn, in the yarn array elements adjacent to each other, intersect each other at right angles.

Preferably, the matrices form a three-dimensional network structure by being in series with each other in the fiber-composite material. In this case, more preferably, the matrices are arranged, in each of the yarn array elements, two-dimensionally in a nearly parallel direction, and the matrices grow, in each of the yarn array elements adjacent to each other, by being in series with each other to form a three-dimensional lattice structure.

The space between the adjacent yarns may be filled 100% with the matrices, or in some cases the space may be partially filled with the matrices.

A member for brakes of the present invention made from synthetic-composite material is manufactured by a special quantity of the parent material made of C/C composite, and formed as a matrices in the form of a three-dimensional lattice, and formed in the space between the above stated assemblage of yarns constituting the parent materials, an Si—SiC-based material and yarns.

At normal temperatures the coefficient of frictional movement for the frictional material for brakes of the present invention is large such as 0.05~0.06. Poor oxidation ability of the C/C composite is overcome by forming matrices layers constituting Si—SiC-based materials on the surface, whereby the goal of a material to be used as the frictional material for brakes which are exposed unavoidably to high temperatures in the presence of oxygen, can by realized. Under the conditions of 500° C., the wear is 1.0% for less than an hour to preferably 0.06% for less than an hour to provide an excellent deterrent for wear.

Further, because the lightweight C/C composite is used as the parent material, when installed in large ground transport machines there is no substantial influence on fuel consumption, and thus no increase in the large energy consumption problem as this material is in compliance with energy saving requests.

Additionally, since C/C composite is the parent material it is very tough, very hard and has excellent shock resistance. Therefore, the unique points of the original C/C composite have been maintained, and the drawback of weak resistance to high frictional temperatures has been eliminated.

Further, because a C/C composite has a series of open pores, the impregnated formation of Si—SiC allows the creation of a continuous structure and then a three dimensional network. Therefore, no matter what part is cut down, compared to the parent material C/C composite, there is a higher level of wear resistance than the original C/C composite and the high heat radiation and elasticity are maintained.

Additionally, the above mentioned C/C composite has matrices formed with carbon in the spaces between carbon fibers of a two and three dimensionally arranged structure, however as long as 10~70% is made of carbon fibers, the remainder can be, for example, non-carbon elements of boron nitride, boron, copper, bismuth, titanium, chrome, tungsten, or molybenum.

In the case where a material having a matrices layer on the surface and made of Si—SiC-based material is used, Si—SiC material will protect the parent material. Because the speed of the formation of the protective fused glass against oxygen is faster than that of the speed of diffusion into the inner parent material, it can protect the parent material from oxidation. Thus, in the case of the member for breaking of the present invention, it shows self-repair ability and thereby an extended period of use is possible. This effect will not be affected adversely even if Si contains a third component such as boron nitride, copper or bismuth or the like.

Additionally, since the heat expansion coefficient of SiC materials is greater than that of a C/C composite, there is a fear that a layer made of SiC materials will peel off under conditions of high temperatures which occur during long periods of braking. On the other hand, however, the peeling that originates in the difference of heat expansion coefficients can be avoided since Si—SiC-based material is at the same level in the heat expansion coefficient as that of the C/C composite, and thus a member for braking with this excellent characteristic can be achieved.

Using the drawings for the fiber composite material used in the present invention, a more in depth explanation is given.

Figure 2:
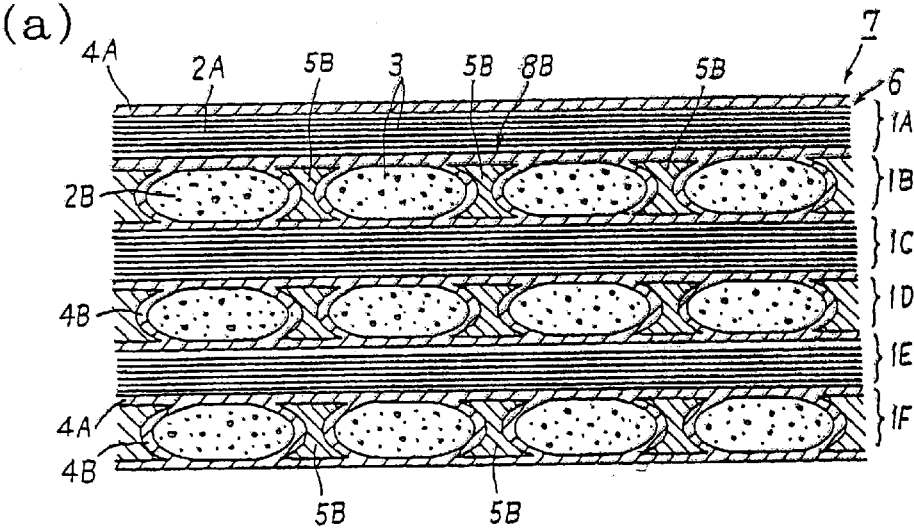
FIG. 2a is a cross-sectional view taken along the line IIa—IIa of FIG. 1.
FIG. 2b is a cross-sectional view taken along the line IIb—IIb of FIG. 1.
Figure 2:
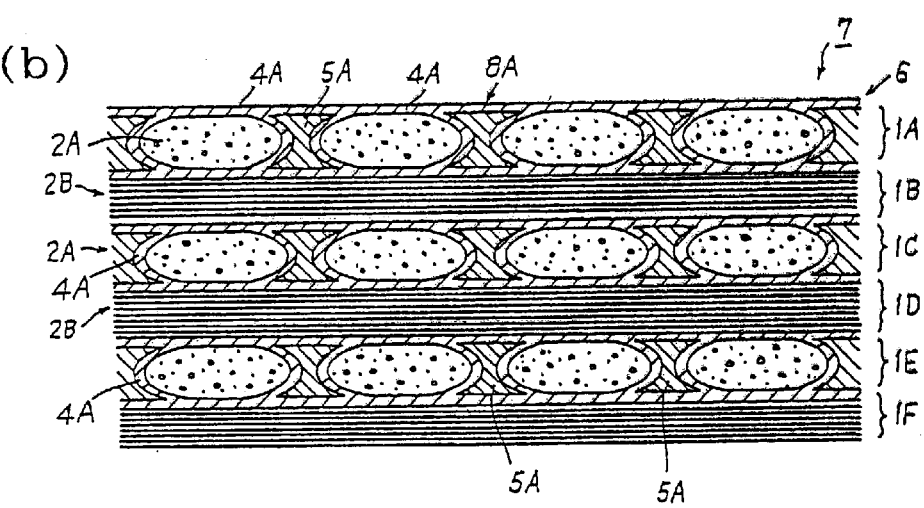
Figure 3:
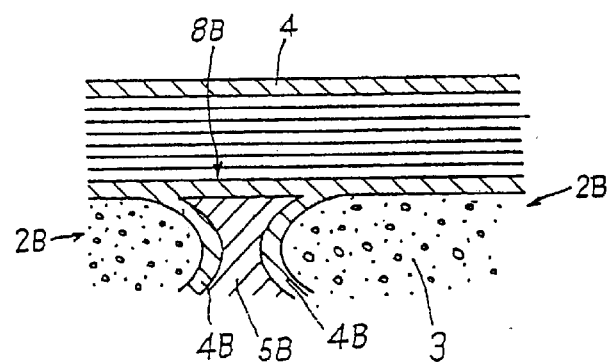

FIG. 1 is a perspective view schematically showing the idea of an assemblage of yarns. FIG. 2A is a cross-sectional view of FIG. 1 taken on line IIa—IIa, and FIG. 2B is a cross-sectional view of FIG. 1 taken on line IIb—IIb. FIG. 3 is an enlarged view of a part of FIG. 2A.

The skeleton of fiber-composite material 7 comprises the assemblage of yarns 6. The assemblage of yarns 6 is constructed by laminating the yarn array elements 1A, 1B, 1C, 1D, 1E, 1F upward and downward. In each of the yarn array elements, each yarn 3 is arranged two-dimensionally, and the direction of the length of each yarn is nearly parallel to the others. The direction of the length of each yarn, in each of the yarn array elements adjacent to each other upward and downward, intersects at right angles. That is, the direction of the length of each yarns 2A in each of the yarn array elements 1A, 1C, 1E is parallel to the others, and the direction of the length thereof intersects the direction of the length, at right angles, of each of the yarns 2B in each of the yarn array elements 1B, 1D, 1F.

Each yarn comprises a fiber bundle 3, comprising carbon fiber and a component of carbon other than carbon fiber. The yarn array elements are laminated to form the assemblage of yarns 6 that is three-dimensional and lattice shaped. Each yarn has become substantially elliptical due to crushing occurring during the pressure molding process to be described below.

In each of the yarn array elements 1A, 1C, 1E, the space among the yarns adjacent to each other is filled with the matrices 8A, each matrix 8A runs along the surface of the yarn 2A in parallel with the yarns. In each of the yarn array elements 1B, 1D, 1F the space among the yarns adjacent to the others is filled with the matrices 8B, each matrix 8B runs along the surface of the yarns 2B in parallel with the yarn.

In this example, the matrices 8A and 8B comprise the silicon carbide phases 4A, 4B that coat the surface of the yarns and the Si—SiC-based material phases 5A, 5B in which the rate of contained carbon is less than in the silicon carbide phases 4A, 4B. The silicon carbide phases may partially contain silicon. In this example, the silicon carbide phases 4A, 4B have also grown between the yarns 2A, 2B adjacent to each other up and down.

Each matrix 8A, 8B runs along the long and narrow surface of yarn, preferably, linearly, and intersect each other at right angles. The matrix 8A in the yarn array elements 1A, 1C, 1E and the matrix 8B in the yarn array elements 1B, 1D, 1F, which intersect the matrices 8A at right angles, are respectively connected in the gap between yarn 2A and 2B. As the result, the matrices 8A, 8B form a three-dimensional lattice as a whole.

Figure 4:
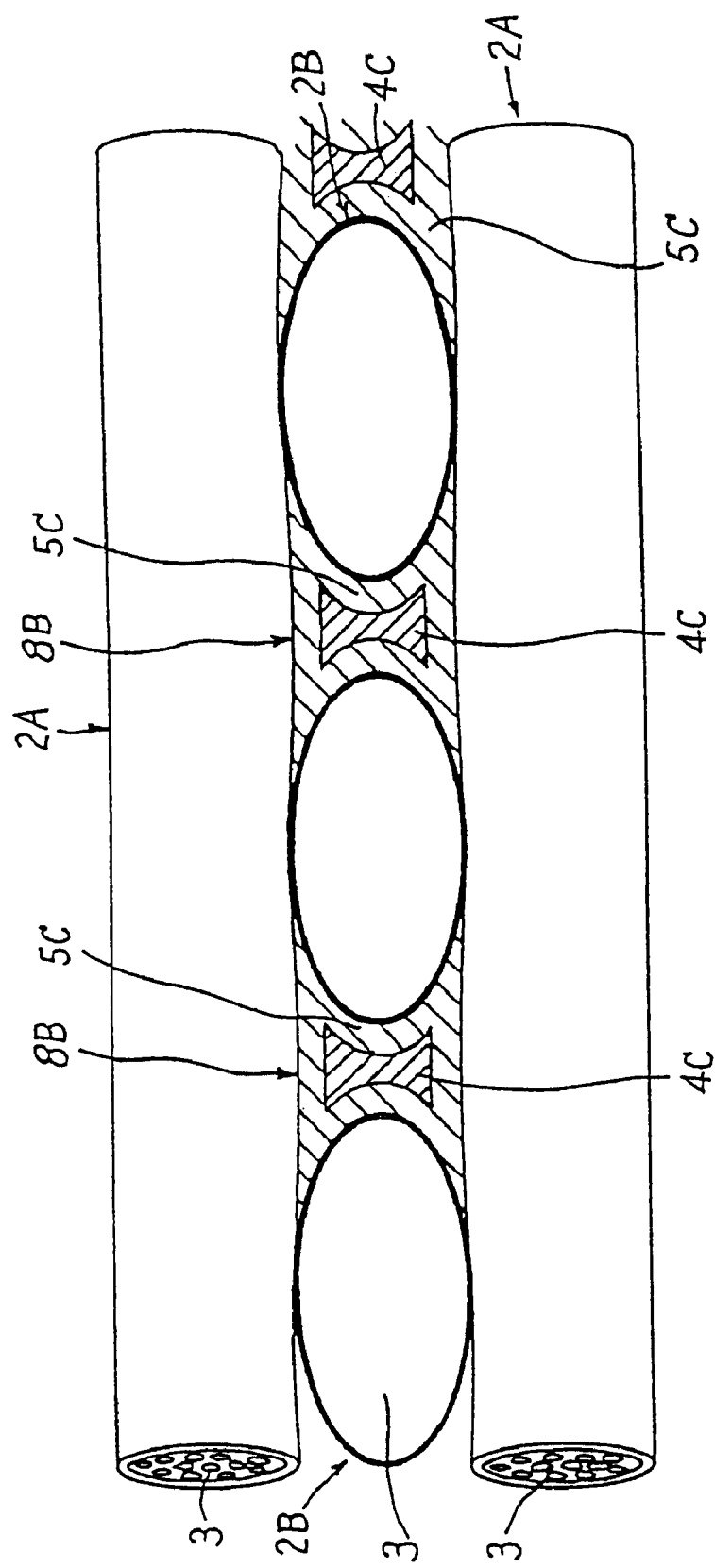
FIG. 4 is a partially sectional perspective view showing the outline of another possible mode for the fiber composite material for a member for brakes of the present invention.

FIG. 4 is a partially sectional perspective view of the main part of a fiber-composite material for another embodiment of the present invention. In this example, a silicon carbide phase does not substantially exist between yarns 2A and 2B adjacent to each other up and down. In each of the yarn array elements, the matrices 8A or 8B are formed individually between yarns 2A and 2A adjacent to each other, or between yarns 2B and 2B adjacent to each other. The shapes of the matrices 8A and 8B are the same as examples FIG. 1 to FIG. 3 except that a silicon carbide phase does not exist between the yarns above and below one another. Each of the matrixes 8A and 8B individually comprise the silicon carbide phase 5C, which has been formed in contact with the surfaces of yarns 2A, 2B and the Si—SiC-based material phase that has been formed separately from the yarns in the silicon carbide phase 5C.

Each of the Si—SiC-based material phases preferably has an inclined composition in which the silicon concentration becomes lower according to the distance from the surface of the yarn, or preferably, comprises a silicon phase.

As shown in FIG. 5A, in the materials for a member for brakes of the present invention, preferably, a C/C composite 15 and the surface of a C/C composite 15 is impregnated with silicon and a matrix layer 13 is formed, particularly it is preferable to have a silicon layer 14 formed on the outer layer portion of the matrix layer 13. Also, 11 is the fiber composite material, and 12 indicates the border of the C/C composite substance before it is impregnated with silicon. Further, it is preferable to have the whole body of the member for brakes of the present invention formed from the above stated composite material.

Figure 5:
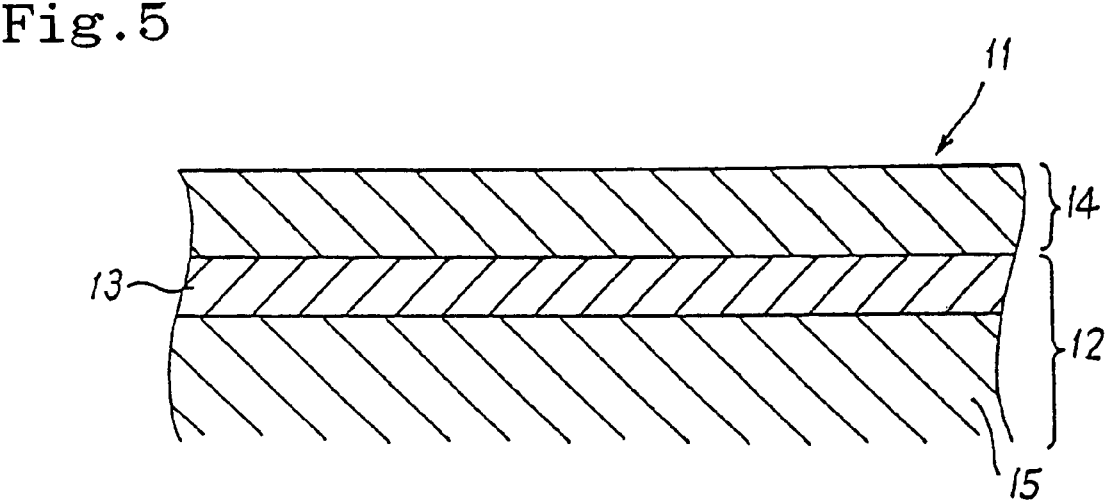
FIG. 5 is a schematically shown cross-sectional structure of one fiber composite material for a member for brakes of the present invention.
Figure 6:
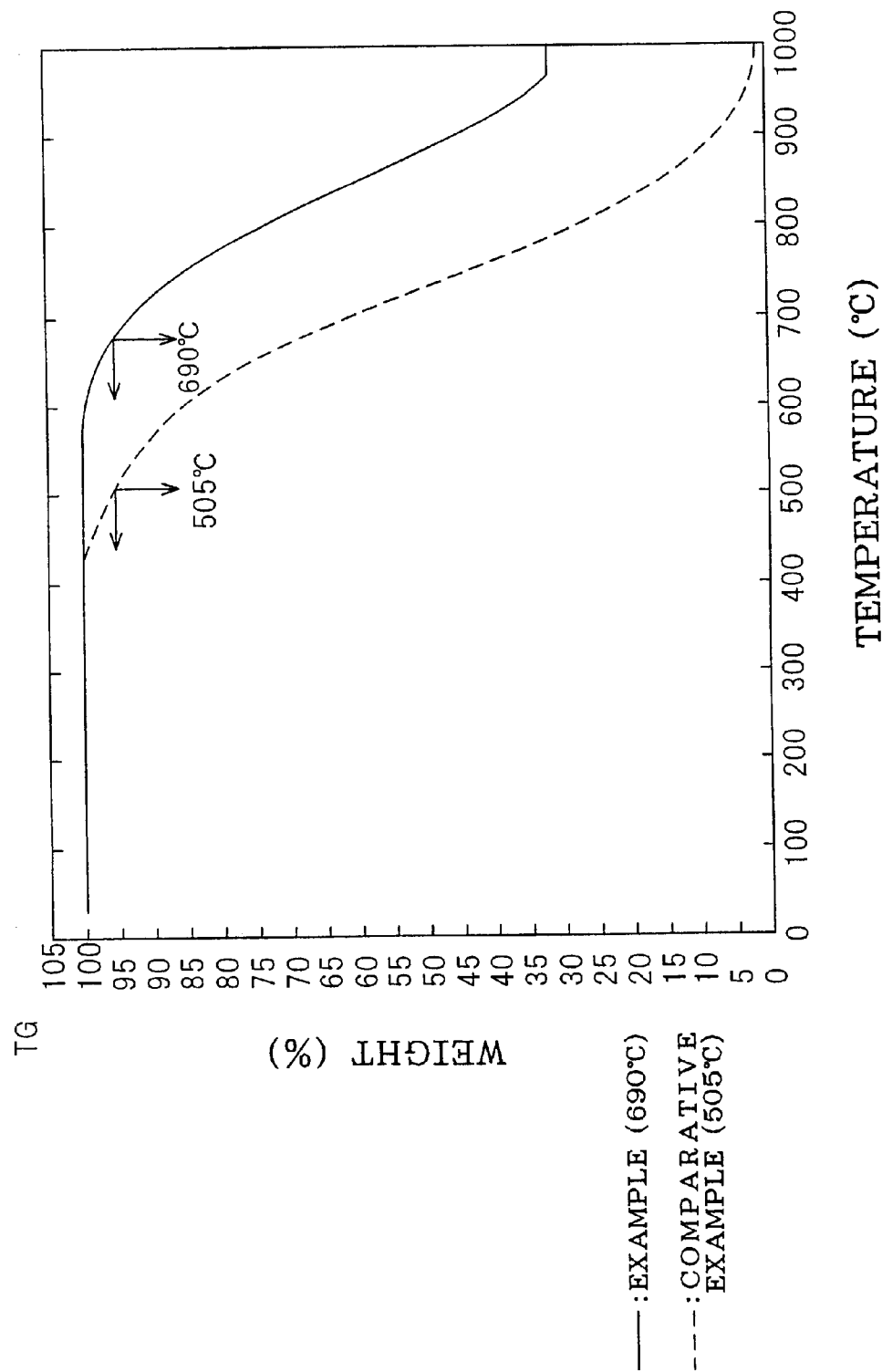
FIG. 6 is a chart showing the relationship between temperature and a decrease in weight of one fiber composite material for a member for brakes of the present invention.

As shown in FIG. 5, in the materials used in a member for brakes of the present invention, it is preferable to have a matrix layer 2 made of just silicon formed on the neighboring surface.

If an Si—SiC-material is only coated on the parent material's surface, a layer made of Si—SiC material can easily peel due to the differences between each other's heat expansion coefficients, under high temperature oxidation conditions. However, a fiber composite material matrix layer formed of Si—SiC-based material has a laminating direction which increases its strength and prevents peeling, and thus can give durability to a member for brakes.

The thickness of the matrix layer 13 formed by impregnating the parent material with Si—SiC material should be preferably 0.01 mm or larger. More preferably 0.05 mm or larger and most preferably 0.1 mm or larger. In the case where the thickness of the matrix layer 13 is under 0.01 mm, under high oxidative conditions, the durability demanded for a member for brakes will not be sufficient.

Further, the Si concentration in the matrix layer 13 of a member for brakes of the present invention should preferably decrease from the surface to of the inside.

This inclination property of Si concentration in the matrix layer 13 can provide remarkable advancement in the healing function of defects in the inner layer portion and outermost layer portion, and the corrosion prevention characteristics and strength under strongly oxidative corrosion circumstances, and additionally can prevent heat stress deterioration in the materials due to differences in the heat expansion coefficient. Since the outermost layer portion of Si concentration is relatively higher than the inner portion of Si concentration, during heating formed micro-cracks can be healed and the characteristic of the prevention of oxidation can be maintained.

Also, for the C/C composite for a member for brakes of the present invention, one, two, or more of the substances boron nitride, boron, copper, bismuth, titanium, chrome, tungsten, or molybenum can be included.

Since these materials possess lubricating characteristics, as in the parent material which was impregnated by a C/C composite, the lubrication characteristics of fibers can be maintained if one of those materials is added to the parent material, which is composed of a C/C composite. Thereby a drop in tenacity, even in a part of the parent material impregnated with Si—SiC material, can be prevented.

For example, the amount of boron nitride to be added would be, based on 100% of the weight of a parent material composed of C/C composite, 0.1~40% of the weight. If it was under 0.1% of the weight then the effects of the lubricating characteristics for boron nitride would be insufficient, in the case where it exceeded 40% of the weight, the fragility of boron nitride would become apparent in the member for brakes.

In this way, shock resistance ability, extreme hardness and lightweight characteristics of a C/C composite are combined with resistance to oxidation, anti-spalling properties, self-lubricative properties, preventative wear characteristics, corrosion resistance and the like of Si—SiC materials in a member for brakes of the present invention. Further, the member has the ability for self-repair and can stand long periods of use at high temperatures, under oxidative conditions. Thus, a member for brakes according to the present invention can preferably be used in the field of large ground transport machines.

The fiber composite material of the present invention can preferably be manufactured by the following method.

Carbon fiber bundles are made by including powdery binder-pitch and cokes in the bundles that eventually become isolated carbon, which function as matrices for carbon fiber bundles, and further, by including phenol resin powder in bundles of fibers, if necessary. A soft coat made from plastic such as a thermal-plastic resin is formed around the carbon fiber bundles to obtain a soft intermediate material. The soft intermediate material is made to have a yarn-shape, as described in the specification of JP-A-2-80639, and then a necessary amount of the materials are laminated, and molded with a hot press at 300° C. to 2000° C. and at an atmospheric pressure of 500 kg/cm$^2$, to obtain a compact. According to demand, the compact is carbonized at 700° C. to 1200° C., and is made to be graphite at 1500° C. to 3000° C., to obtain a burned product.

The carbon fiber may be any one of the pitch-based carbon fibers that is obtained by providing pitch for spinning use, melt-spinning the pitch, making the pitch infusible and carbonizing the pitch, or PNA based carbon fiber that is obtained by giving the flame resistance to an acrylonitrile polymer (or copolymer) fiber and by carbonizing the fiber.

As a precusor for carbon that is necessary for forming matrices, thermosetting resins such as phenol resins and epoxy resins, tar and pitch may be used, and these may contain cokes, metal, metal compounds, inorganic and organic compounds.

After that, the compact or the burned product, produced as in the above method, and Si are held in a temperature range of 1100° C. to 1400° C. under a pressure of 0.1 to 10 hPa in the furnace for one hour or more. Preferably, in the process, an inert gas is allowed to flow to form a Si—SiC layer on the surface of the compact or the burned product, in such a way that 0.1 or more than 0.1 (NL) (normal litter: corresponding to 5065 litter at 1200° C., under a pressure of 0.1 hPa) of the gas is allowed to flow per 1 kg of the total weight of the compact, or the burned product, and Si. Thereafter, the temperature is raised to 1450° C. to 2500° C., preferably to 1700° C. to 1800° C. to melt silicon and to impregnate the inside of the pores of the above-described compact or burned product, to form Si—SiC material. In the process, in the case in which the compact is used, the compact is burned to obtain the fiber-composite material.

The compact, or the burned product, and Si are held at a temperature of 1100° C. to 1400° C., under a pressure of 1 to 10 hPa for one hour or more. In the process, the amount of inert gas to be used is controlled in such a way that per 1 kg of the total weight of the compact, or the burned product, and Si, 0.1 or more than 0.1 NL, preferably, 1 or more than 1 NL, more preferably, more than 10 NL of the inert gas is made to flow.

Thus, in the burning process (namely in the process in which Si is not yet melted or impregnated), because providing an atmosphere of inert gas removes the generated gas such as CO brought by the change in which inorganic polymer or inorganic substance become ceramics from the atmosphere of burning and prevents the contamination of the burning atmosphere caused by outside factors such as $O_2$ or the like present in the air, it is possible to keep low porosity of the composite material that is obtained by melting and impregnation of Si in the subsequent process.

In the process in which Si is melted and impregnated into the compact or the burned product, the surrounding temperature is raised to 1450° C.–2500° C., more preferably to 1700° C.–1800° C. Then, the pressure in the burning furnace is maintained preferably in a range of 0.1 to 10 hPa.

As described above, because the combination of the usage of the soft intermediate material, the impregnation of silicon and the fusion of silicon brings about the retention of long and narrow pores between the yarns in the burned product or the compact, silicon migrates into the inner part of the compact or the burned product along the long and narrow pores. In the migration process, silicon reacts with carbon in the yarns and is gradually carbonized from the surface side of the yarns, which can produce the fiber-composite material according to the present invention. Also, another possibility for a fiber composite material with this kind of make-up is that a fiber composite material layer could be formed on a part of the outer layer portion of the parent material made of a C/C composite.

The inclination of concentration in Si—SiC-based material in the whole matrix layer is controlled by the porosity and the diameter of the pores to the compact of the sintered body. For example, in the case where the concentration of a Si—SiC-based material layer is made higher than any other portion at a depth of 0.01 to 10 mm from the surface layer of the fiber-composite material, the porosity in the portion having a desired high concentration in the compact or the burned product is made to be in the range from 5 to 50% and the average diameter of the pores is made to be 1 $\mu$m or more. In the other portions, the porosity and the average diameter of the pores is made the same or lower than the portion having the high concentration. The porosity in the portion having the desired height concentration of the compact or burned product is preferably 10–50% and the average diameter of the pores is preferably 10 um or more. This is because the binder in the compact or the burned product is hard to remove if the porosity is less than 5%, and if the porosity exceeds 50% the Si—SiC-based material impregnates deep into the inner portion of the parent material, which decreases the shock resistance of the composite material.

In order to form the composite material layer on the surface of C/C composite; the molded product designed to have a porosity of 0.1 to 30%, at least in the part near to the surface during burning, is preferably used.

In order to make the porosity in the composite or the burned product become lower from the surface toward the inside, a plurality of preformed sheets, made of preformed yarn of different binder-pitches, are arranged and molded in such a manner so that the binder-pitch becomes larger from the inside to the surface layer side.

In order to make the silicon concentration in the above stated fiber-composite material layer have an incline, the burned product adjusted to have porosity in the part near the surfaces, which becomes lower from the surface to the inside, or the compact adjusted to have porosity at least in the part near the surface which becomes lower, during burning, from the surface to the inside, are used to produce the composite material.

The manufacturing process of a composite material manufactured by the above mentioned methods for a member for brakes of the present invention can be completed by using a surface grinding disk to apply an appropriately measured cutting process. A member for brakes of the present invention can be used as the brake material for large ground transport machines.

EXAMPLE

Hereinafter, the present invention is illustrated in more detail by referring to examples; however, it should be understood that the present invention is not limited to the examples.

The properties of the composite materials obtained by each example are measured by the methods as described below.

Method for Evaluating Dynamic Coefficient of Friction

The test piece is mounted on a jig and spun for 10 minutes at 100 rpm. The test piece is pressed against a partner material (SUJ, 10 mm ball) with a 2 kg load Fp(N), at that time the frictional strength is measured. The dynamic coefficient of friction is calculated with the following formula.

Coefficient of Friction $\mu = Fs/Fp$

Method for Evaluating the Specific Abrasive Wear

The test piece is mounted on a jig and spun for 10 minutes at 100 rpm. The test piece is pressed against a partner material (SUJ, 10 mm ball) with a 2 kg load P, at that time the frictional strength is measured. The pre-testing weight Wa(mg) and post-testing weight Wb(mg) are measured. Abrasive wear V(mm$^3$) is calculated with the following formula, using the density $\rho$(g/cm$^3$) of the test piece.

$V = (Wa - Wb)/\rho$

Specific abrasive wear Vs(mm$^3$/(N·km)) is calculated with the following formula, using abrasive wear V(mm$^3$), test load P(N) and sliding distance L(km).

$Vs = V/(P \cdot L)$

Method for Evaluating Oxidation Resistance

The oxidation resistance was evaluated by leaving a test piece in a furnace (1% $O_2$, 99% $N_2$) at 1150° C. and then measuring the weight loss rate after 200 hours.

Method for Evaluating the Compressive Strength

Compression strength is calculated by using a compression-loaded test piece with the following formula.

Compressive strength=$P/A$ (in the formula, P is the load when loaded with the maximum load, A is the minimum sectional area of the test piece)

Method for Evaluating the Rate of Weight Decrease Under High Temperature Oxidation Conditions Keep a fixed weight test piece at 400° C. for 100 hours in an ambient atmosphere, then measure the weight. Subtract the post-test weight from the pre-test weight to find the weight decrease. The rate of weight decrease can be found by applying the weight decrease to the pre-test weight.

Method for Evaluating Interlaminar Shear Strength

Interlaminar shear strength is calculated with the following formula, after three-point bending, regarding the distance of the test piece thickness h multiplied by 4 as the distance between the supports.

Interlaminar shear strength=$3P/4bh$ (in the formula, P is the maximum bending load when broken, and b is the width of the test piece)

Method for Evaluating Bending Modulus

Bending modulus is calculated with the following formula, using the initial gradient $P/\sigma$ of the straight part of load-deflection curve, after three-point bending, regarding the distance of the test piece thickness h multiplied by 40 as the distance L between the supports.

Bending modulus $1/4 \cdot L^3/bh^3 \cdot P/\sigma$ (in the formula b is the width of the test piece)

Method for Evaluating Self-restoration

Self-restoration is measured on the test piece annealed for 2 hours at 900° C., after making micro-cracking inside by applying repeated stresses of Max: 20 Mpa to Min: 5 Mpa, 100,000 times.

Method for Measuring the Temperature in a 5% Weight Reduction

In an atmosphere with sufficient air circulation, measure the change in weight of the test sample as the temperature rises 10° C./minute until the change in temperature has caused the test sample's weight to been reduced by 5%

EXAMPLE

A member for brakes was manufactured by, making a fiber-composite material by arranging a matrix layer composed of Si—SiC-based materials on a 10 mm thick C/C composite parent material. The parent material is impregnated with Si—SiC-based material to form a fiber-composite material layer with a thickness of 50 μm.

The C/C composite was manufactured by the hereinafter described method.

A phenol resin impregnated prepreg sheet and carbon fibers pulled and aligned in one direction are laminated in line with one another and the resin is cured by putting it in a hot press at 180° C. and at 10 kg/cm$^2$. Then by baking the resultant in nitrogen at 2000° C., a C/C composite with a density of 1.0 g/cm$^3$ and porosity of 50% was obtained.

The C/C composite was then vertically placed in a carbon crucible filled with a 99.8% pure silicon powder with an average particle size of 1 mm. After that, the crucible was moved into a burning furnace. The C/C composite was processed to impregnate silicon into the composite and produce the composite material, under the following conditions: a burning furnace temperature of 1300° C., a flow rate of argon gas as inert gas of 20 NL/minute, an internal furnace pressure of 1 hPa, a holding time of 4 hours with an increase in temperature to 1600° C. under the same furnace pressure.

From the compound materials above, using a surface grinding disk the test piece is taken out from the vicinity of the surface where the Si—SiC materials and the C/C composite are sufficiently made into a composite to a length of 60 mm, a width of 60 mm, and a thickness of 5 mm, then using a #800 whetstone the surface is finishing polished to form a member for brakes. The polished surface of the obtained member for brakes has a roughness of Ra=1 μm and a flatness of 2 μm in terms of straightness.

The results of the measurements of the friction coefficient, specific abrasive wear, oxidation resistance, interlaminar shear strength, compressive strength, bending modulus, abrasive wear durability under high temperature oxidation conditions, and temperature at a 5% weight reduction for the obtained member for brakes are shown in table 1. Also, the relationship between the temperature and the weight reduction for the measurement of the temperature at a 5% weight reduction are shown in chart 6. Note the coefficient of friction for the materials is a value determined in a parallel direction in relation to the lamination direction of the fibers.

Comparative Example

A C/C composite is manufactured in a similar way to that of Example. With a flat grinding disk, the obtained C/C composite is cut down in a process to a height of 60 mm, a width of 60 mm, and a thickness of 5 mm, then using a #800 whetstone the surface is finishing polished to form a member for brakes. The polished surface of the obtained member for brakes has a roughness of Ra=25 μm and a flatness of 6 μm in terms of the straightness. Using the same method of evaluation as in Example, the results of the performances of the obtained member for brakes are combined and shown in table 1.

TABLE 1

|  | Example | Comparative Example |
| --- | --- | --- |
| Compressive strength (MPa) | 170 | 150 |
| Bending modulus (GPa) | 52 | 50 |
| Interlaminar shear strength (MPa) | 16 | 18 |
| Specific abrasive wear mm$^3$/(N · km) | 0.0 | 0.55 |
| Coefficient of kinetic friction | 0.1 | 0.1 |
| Self-restration | 85/170 | 0/150 |
| Oxidation resistance (%) | 29 | 100 |
| Rate of weight loss in the atmosphere (wt %/hr) 400° C. | 0.0005 | 0.05 |
| Temperature for 5% weight loss (° C.) | 690 (σ = 30° C.) | 505 (σ = 30° C.) |

In table 1, a member for brakes made from fiber composite material is prepared by a yarn, including at least a bundle of carbon fiber and a carbon component other than carbon fiber, which is three-dimensionally combined and integrally formed so as to avoid separation of the carbon fiber bundle and the carbon component, into an assemblage of yarns, and the space between the adjacent above stated yarns is then filled with a matrices made of Si—SiC-based material, which has the same level wear coefficient as C/C composite materials used in an ordinary member for brakes, and at the same time is known to have a remarkably excellent ability to prevent frictional wear in an oxygen present atmosphere under conditions of high temperatures.

In comparison to the C/C composite of the comparative example, the dynamic coefficient of friction for the member for brakes of the present invention is 1/5 or less. Additionally, in comparison to this C/C composite, the object of the present invention shows an excellent value in compressive strength and interlaminar shear strength, and also shows a value equal to that of the C/C composite in the bending modulus.

The reason why the compressive strength becomes higher than that of the C/C composite when the Si—SiC materials are impregnated is considered to be that SiC penetrated into the space between the carbon fibers.

The member for brakes according to the present invention is extremely excellent in wear resistance at high temperatures in the presence of oxygen. Moreover, since the member has a layer made from Si—SiC materials on its surface that possesses corrosion resistance, creep resistance and spalling resistance, it can overcome the lower oxidation resistance, which is a drawback of a C/C. Thus, the member can be used at high temperatures even in the presence of oxygen. Also, this is combined with the quality of excellent wear characteristics.

Moreover, since C/C composite, which is the parent material, is light and has very little energy loss, it can meet the requirements of energy conservation.

Additionally, since C/C composite is the parent material, durability is good, shock resistance is excellent and it has supreme hardness.

Therefore, this clearly is a very promising material for a member for brakes for a braking device for large ground transport machines that operate at high temperatures, even in the presence of oxygen.

What is claimed is:

1. A brake member made of a fiber-composite material comprising:

a plurality of first yarns arranged in a first layer, each first yarn extending in a first longitudinal direction, and comprising a bundle of carbon fibers and an additional carbon component;

a plurality of second yarns arranged in a second layer, each second layer extending in a second longitudinal direction and comprising a bundle of carbon fibers and an additional carbon component, said second longitudinal direction being substantially perpendicular to said first longitudinal direction; and a Si—SiC matrix for three-dimensionally integrating the yarns to one another, said matrix being interposed between adjacent yarns within each layer and between yarns of adjacent layers.

2. The brake member of claim 1, wherein said matrix has a silicon carbide phase grown along the surface of each yarn.

3. The brake member of claim 2, wherein said matrix has a silicon phase comprising silicon, and said silicon carbide phase is grown between said silicon phase and each yarn.

4. The brake member of claim 1, wherein said matrix has an inclined composition in which the amount of silicon increases with increasing distance from the surface of each yarn.

5. The brake member of claim 1, wherein said matrix defines a three-dimensional network structure throughout said material.

6. The brake member of claim 1, wherein said fiber-composite material has a coefficient of kinetic friction of 0.05–0.6.

7. The brake member of claim 1, wherein said fiber-composite material has a specific abrasive wear of 0.0–0.3 mm$^3$/N·km.

8. The brake member of claim 1, wherein said fiber-composite material loses weight by 5% at 600° C. or more when a temperature of said fiber-composite material is raised at a rate of 10° C./min. in the atmosphere.

* * * * *